US009435399B2

(12) United States Patent
Akami

(10) Patent No.: US 9,435,399 B2
(45) Date of Patent: Sep. 6, 2016

(54) REDUCTION GEAR

(71) Applicant: NABTESCO CORPORATION, Tokyo (JP)

(72) Inventor: Toshiya Akami, Gifu (JP)

(73) Assignee: NABTESCO CORPORATION, Tokyo (JP)

(*) Notice: Subject to any disclaimer, the term of this patent is extended or adjusted under 35 U.S.C. 154(b) by 159 days.

(21) Appl. No.: 14/361,640

(22) PCT Filed: Nov. 21, 2012

(86) PCT No.: PCT/JP2012/080209
§ 371 (c)(1),
(2) Date: May 29, 2014

(87) PCT Pub. No.: WO2013/080862
PCT Pub. Date: Jun. 6, 2013

(65) Prior Publication Data
US 2015/0013489 A1  Jan. 15, 2015

(30) Foreign Application Priority Data

Nov. 30, 2011  (JP) .................. 2011-261841

(51) Int. Cl.
*F16H 1/06*  (2006.01)
*F16H 1/32*  (2006.01)
(Continued)

(52) U.S. Cl.
CPC .............. *F16H 1/06* (2013.01); *B60K 17/043* (2013.01); *B60K 17/046* (2013.01); *F16H 1/32* (2013.01);
(Continued)

(58) Field of Classification Search
CPC .............. F16H 1/06; F16H 1/32; F16H 1/28; F16H 2001/325; F16H 2001/326; F16H 57/022; F16H 57/023; F16H 57/021; B60K 17/043; B60K 17/046; B60K 17/16
See application file for complete search history.

(56) References Cited

U.S. PATENT DOCUMENTS 3,208,293 A * 9/1965 Boehm .................... B64C 13/24
475/176
4,733,578 A * 3/1988 Glaze ..................... B60K 17/16
475/160
(Continued)

FOREIGN PATENT DOCUMENTS

JP  57-198445 U  12/1982
JP  03-026854 U  3/1991
(Continued)

OTHER PUBLICATIONS

An Office Action; "Notification of Reason for Rejection," issued by the Japanese Patent Office on Jul. 24, 2015, which corresponds to Japanese Patent Application No. 2011-261841 and is related to U.S. Appl. No. 14/361,640; with English language translation.
(Continued)

*Primary Examiner* — William Kelleher
*Assistant Examiner* — Jude Agendia
(74) *Attorney, Agent, or Firm* — Studebaker & Brackett PC

(57) ABSTRACT

Provided is a reduction gear with which allowable output can be further increased and a reduction in size can be achieved. A reduction gear (1) has a case (2), a speed reduction mechanism (3) accommodated within the case (2), a shaft portion (51) to which output of the speed reduction mechanism (3) is transmitted, and a pinion (52) coupled to the shaft portion (51). The speed reduction mechanism (3) has an external tooth gear (15) to which output of an electric motor (100) is transmitted, and a carrier (17) holding the external tooth gear (15). The pinion (52) and the shaft portion (51) are integrally formed, and the shaft portion (51) and the carrier (17) are spline-coupled to each other. A pair of main bearings (32, 33) are held by the case (2), and rotatably support the carrier (17).

6 Claims, 4 Drawing Sheets

(51) Int. Cl.
   *F16H 57/021* (2012.01)
   *B60K 17/04* (2006.01)
   *B60K 7/00* (2006.01)
(52) U.S. Cl.
   CPC ........... *F16H 57/021* (2013.01); *B60K 7/0007* (2013.01); *B60K 7/0015* (2013.01); *F16H 2001/323* (2013.01); *Y10T 74/19679* (2015.01)

(56) References Cited

U.S. PATENT DOCUMENTS

| | | | | |
|---|---|---|---|---|
| 4,843,919 A * | 7/1989 | Nemoto | ..................... | F16H 1/32 475/331 |
| 6,889,572 B2 * | 5/2005 | Nett | ........................ | F16H 1/222 74/410 |
| 7,553,249 B2 * | 6/2009 | Nohara | ..................... | F16C 3/08 475/162 |
| 7,938,748 B2 * | 5/2011 | Minegishi | ............. | F03D 7/0204 475/163 |
| 8,777,574 B2 * | 7/2014 | Asano | .................. | F03D 7/0224 416/155 |
| 9,157,508 B2 * | 10/2015 | Allgaier | .................. | F16H 1/203 |
| 2006/0205554 A1 * | 9/2006 | Nohara | ................. | F03D 7/0204 475/179 |
| 2007/0072727 A1 * | 3/2007 | Nohara | ..................... | F16C 3/08 475/178 |
| 2011/0182735 A1 * | 7/2011 | Kodama | ................ | F03D 7/0224 416/155 |
| 2011/0243739 A1 * | 10/2011 | Asano | .................. | F03D 7/0224 416/147 |

FOREIGN PATENT DOCUMENTS

| | | |
|---|---|---|
| JP | 2006-132651 A | 5/2006 |
| JP | 2010-060119 A | 3/2010 |
| JP | 2010-216591 A | 9/2010 |

OTHER PUBLICATIONS

International Preliminary Report on Patentability (Chapter I of the Patent Cooperation Treaty) and translation of Written Opinion of the International Searching Authority; PCT/JP2012/080209 issued on Jun. 3, 2014.

International Search Report; PCT/JP2012/080209; Jan. 29, 2013.

* cited by examiner

REDUCTION GEAR

TECHNICAL FIELD

The present invention relates to a reduction gear connected to a motor.

BACKGROUND ART

In a known configuration of a reduction gear for decelerating rotation of a motor or the like and amplifying torque, a gear is held by a carrier (e.g., see Patent Documents 1 and 2). In a configuration recited in Patent Document 1, a speed reduction mechanism (20) has a small gear (43), a large gear (42), a crank mechanism member (27), an external tooth gear (23), a support body (25), and an internal tooth gear body (21).

Output of a motor (10) is decelerated due to meshing between the small gear (43) and the large gear (42). Rotation of the large gear (42) is transmitted to the external tooth gear (23) via the crank mechanism member (27). The external tooth gear (23) has a plurality of external teeth and meshes with the internal tooth gear body (21) via a pin. The number of teeth of the internal tooth gear body (21) is slightly different from the number of teeth of the external tooth gear (23). As a result, when the crank mechanism member (27) rotates once, the external tooth gear (23) changes its angle by several degrees, and the rotation transmitted from the crank mechanism member (27) is decelerated. This rotation of the external tooth gear (23) is transmitted to the support body (25).

The support body (25) is coupled to a pinion (35) in a state of being supported by the internal tooth gear body (21) via a bearing (24a). In the configuration recited in Patent Document 1, external teeth formed on the outer circumference of an end of the support body (25) mesh with internal teeth formed on the inner circumference of the pinion (35). Thus, the output of the speed reduction mechanism (20) is transmitted from the support body (25) to the pinion (35). The pinion (35) further transmits a motive power by meshing with another gear.

CITATION LIST

Patent Document

Patent Document 1: JP 2006-132651A
Patent Document 2: JP 2010-60119A

DISCLOSURE OF THE INVENTION

Problem to be Solved by the Invention

In the configuration recited in Patent Document 1, since the internal teeth are formed on the inner circumference of the pinion (35) in a portion in which pinion teeth are formed, the thickness of the pinion (35) is small. If the thickness of the pinion (35) is small, the allowable load (allowable torque) of the pinion (35) is small. For this reason, the torque that can be transmitted from the support body (25) to the pinion (35) is limited.

On the other hand, in the configuration recited in Patent Document 2, a pinion (15) and a spline shaft portion (39) for supporting the pinion (15) are integrally formed. Therefore, it is conceivable to integrally form the pinion (35) and the support body (25) recited in Patent Document 1, as in the configuration recited in Patent Document 2.

However, even in this case, the support body (25) configured to be integrated with the pinion (35) has a configuration in which a portion connected to the pinion (35), a portion supported by the bearing (24a), and a portion connected to the external tooth gear (23) are arranged in an axial direction. For this reason, the support body (25) has an axially elongated shape, and the reduction gear (20) is large.

In view of the foregoing situation, it is an object of the present invention to provide a reduction gear with which allowable output can be further increased and a reduction in size can be achieved.

Means for Solving the Problem

A reduction gear according to a first aspect of the present invention for achieving the above-stated object is a reduction gear including: a case; a speed reduction mechanism accommodated within the case and having a gear to which output of a motor is transmitted and a carrier that holds the gear; a shaft portion to which output of the speed reduction mechanism is transmitted; and a pinion coupled to the shaft portion, wherein the pinion and the shaft portion are integrally formed, and the shaft portion and the carrier are spline-coupled to each other, and the reduction gear further includes a pair of bearings that are held by the case and rotatably support the carrier.

According to this aspect of the invention, the shaft portion and the pinion are integrally formed, and therefore the coupling strength between the shaft portion and the pinion can be greatly increased. Thus, the shaft portion driven when receiving output from the speed reduction mechanism can transmit large output (torque) to the pinion. Accordingly, the allowable output of the reduction gear can be further increased. Furthermore, as a result of the pair of bearings supporting the carrier, the carrier and the pair of bearings can be disposed so as to face each other in a radial direction (such that the axial positions thereof overlap each other). Thus, the length that the carrier and the pair of bearings occupy in the axial direction as a whole can be shortened, and consequently, a reduction in size of the reduction gear can be achieved.

Consequently, according to the present invention, a reduction gear can be provided with which allowable output can be further increased and a reduction in size can be achieved.

A reduction gear according to a second aspect of the present invention is the reduction gear according to the first aspect of the invention, wherein the shaft portion includes a projecting portion having, on an outer circumference thereof, an external spline portion, and the carrier includes a recess portion having, on an inner circumference thereof, an internal spline portion meshing with the external spline portion.

According to this aspect of the invention, the shaft portion and the carrier can be connected with a simple configuration in which the internal spline portion of the recess portion is fitted to the external spline portion of the projecting portion. Moreover, due to the configuration in which the projecting portion is extended from an end portion of the pinion in the axial direction, the pinion can be configured as a solid member. Thus, both the strength of the pinion and the coupling strength between the pinion and the shaft portion can be increased, and consequently, the allowable output of the reduction gear can be further increased.

A reduction gear according to a third aspect of the present invention is the reduction gear according to the first or second aspect of the invention, wherein the shaft portion is rotatably supported by the pair of bearings via the carrier.

According to this aspect of the invention, the bearings for supporting the carrier can also be used as bearings for supporting the shaft portion. Thus, another bearing for supporting the shaft portion does not need to be separately attached to the shaft portion, and therefore the shaft portion will not be elongated in the axial direction. Accordingly, a further reduction in size of the reduction gear can be achieved.

A reduction gear according to a fourth aspect of the present invention is the reduction gear according to any one of the first to third aspects of the invention, wherein a portion where the shaft portion and the carrier are spline-coupled to each other faces one of the pair of the bearings, in a radial direction of the shaft portion.

According to this aspect of the invention, the length that the shaft portion, the carrier, and the bearings occupy in the axial direction as a whole can be shortened. Accordingly, a further reduction in size of the reduction gear can be achieved.

A reduction gear according to a fifth aspect of the present invention is the reduction gear according to any one of the first to fourth aspects of the invention, wherein the shaft portion has a pair of fitting portions fitted to the carrier and provided so as to sandwich, in an axial direction, the portion where the shaft portion and the carrier are spline-coupled to each other, and the pair of fitting portions are fixed to the carrier in a tight-fitting manner.

According to this aspect of the invention, at least a part of a load exerted between the shaft portion and the carrier can be received by the pair of fitting portions. Thus, the load exerted on the portion where the shaft portion and the carrier are spline-coupled can be reduced. That is to say, the durability of the spline-coupled portion can be improved through the reduction in the load on the spline-coupled portion. Furthermore, as a result of the pair of fitting portions being disposed so as to sandwich the spline-coupled portion in the axial direction, exertion of a force other than torque on the spline-coupled portion is suppressed. That is to say, exertion of a force other than the force intended in design on the spline-coupled portion is suppressed. Thus, the durability of the reduction gear can be further improved through the reduction in the load on the spline-coupled portion.

A reduction gear according to a sixth aspect of the present invention is the reduction gear according to any one of the first to fifth aspects of the invention, further including a screw member that is screwed into the shaft portion and held by the carrier, wherein at least one of an end face of the pinion and an end face of the shaft portion is received so as to face a predetermined opposing face of the carrier in the axial direction, and the pinion and the shaft portion are held by the carrier due to an axial force received by the shaft portion from the screw member.

According to this aspect of the invention, the screw member and an integral piece of the pinion and the shaft portion are fixed to the carrier so as to sandwich the carrier. Thus, relative movement of the shaft portion and the carrier in the axial direction can be suppressed, and consequently, fretting friction in the portion where the shaft portion and the carrier are spline-coupled can be suppressed.

Effects of the Invention

According to the present invention, a reduction gear can be provided with which allowable output can be further increased, and a reduction in size can be achieved.

DESCRIPTION OF EMBODIMENTS

Hereinafter, modes for carrying out the present invention will be described with reference to the drawings. An embodiment of the present invention can be widely applied to reduction gears. More specifically, the embodiment of the present invention can be widely applied to reduction gears in slewing gears provided in construction equipment, reduction gears provided in wind turbines, and reduction gears provided in other general equipment, for example. Possible exemplary reduction gears provided in wind turbines include a reduction gear for a drive for controlling a pitch angle of a blade, and a reduction gear for a yaw drive. A yaw drive is provided in order to rotate, with respect to a tower, a nacelle that is rotatably disposed in an upper part of the tower and within which a generator or the like is disposed.

Figure 1:
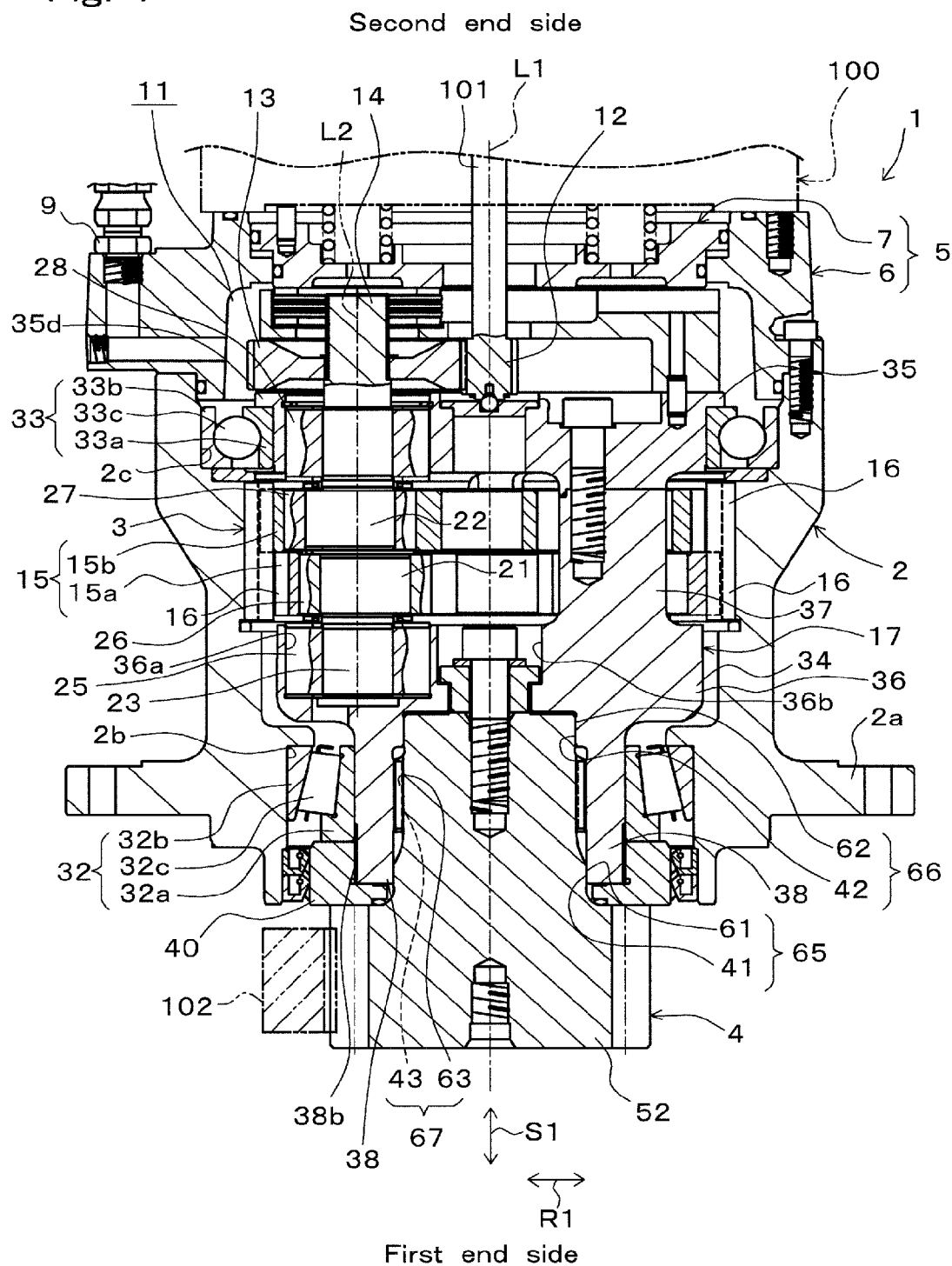
FIG. 1 is a cross-sectional diagram showing a reduction gear, and also shows a side face of a part of the reduction gear.
Figure 2:
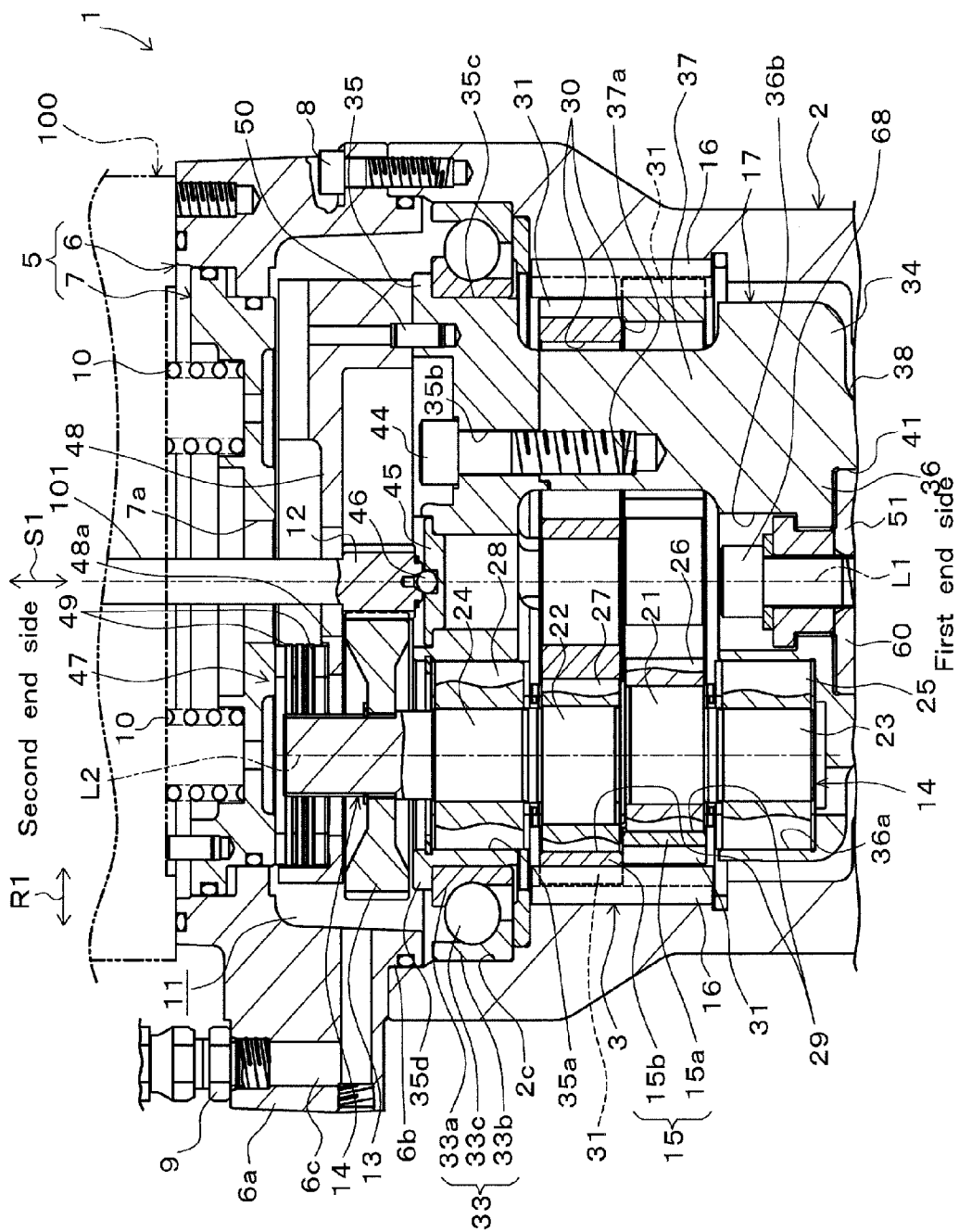
FIG. 2 is an enlarged view of a part of the reduction gear in FIG. 1.
Figure 3:
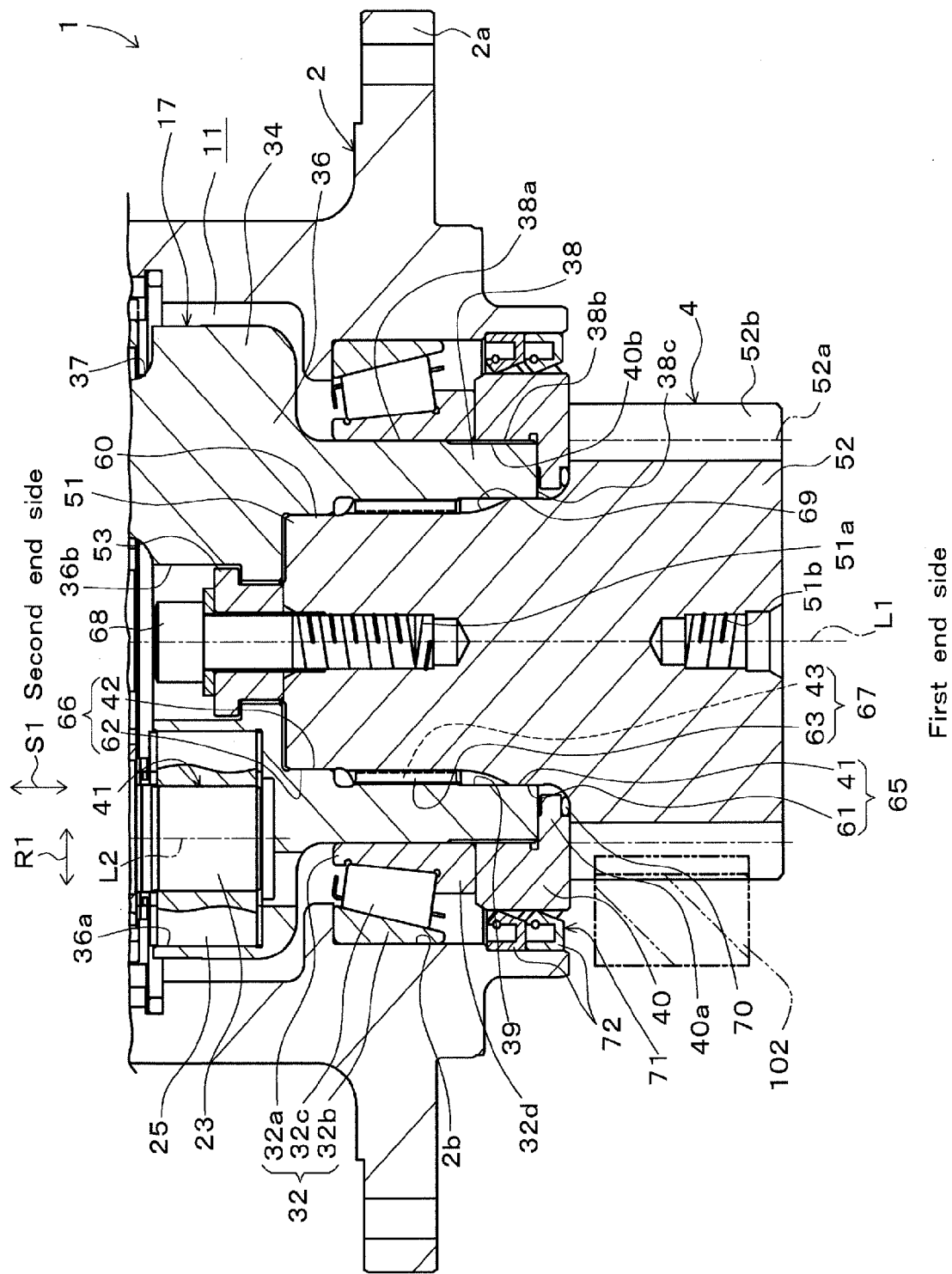
FIG. 3 is an enlarged view of a part of the reduction gear in FIG. 1.

FIG. 1 is a cross-sectional diagram showing a reduction gear 1, and also shows a side face of a part of the reduction gear 1. FIGS. 2 and 3 are enlarged views of respective parts of the reduction gear 1 in FIG. 1. As shown in FIG. 1, the reduction gear 1 decelerates rotation that is output from an electric motor 100 serving as a driving source, amplifies output (torque) from the electric motor 100, and outputs the amplified torque from a pinion 52 in a later-described pinion unit 4 to a gear 102 provided outside the reduction gear 1. The gear 102 is a ring gear, for example.

The reduction gear 1 is configured to include a case 2, a speed reduction mechanism 3, the pinion unit 4, a cover 5, and the like. The pinion unit 4 is disposed at a first end of the reduction gear 1. On the other hand, the electric motor 100 is attached to a second end of the reduction gear 1. Note that in the following description, regarding the reduction gear 1, the side on which the pinion unit 4 is disposed will be deemed as a first end side, and the side on which the electric motor 100 is attached will be deemed as a second end side.

The case 2 is formed in a cylindrical shape having open ends on the first end side and the second end side. A flange portion 2a is formed in the vicinity of a first end portion of the case 2. The flange portion 2a is provided as a portion fixed to a casing or the like (not shown) using a screw member. A later-described pin internal teeth 16 of the speed reduction mechanism 3 is disposed on the inner circumference of the case 2. The cover 5 is attached to a second end portion of the case 2.

As shown in FIG. 2, the cover 5 is provided as a disk-like member and disposed so as to cover the opening of the case 2 on the second end side. The cover 5 includes a fixed cover 6 and a movable cover 7. The fixed cover 6 is formed in a cylindrical shape and has a projecting portion 6a formed in a part of the fixed cover 6 in the circumferential direction. The projecting portion 6a projects radially outward of the fixed cover 6. The fixed cover 6 also has a ring-like projecting portion 6b formed in an inner-circumferential portion of an end of the fixed cover 6. The projecting portion 6b is fitted to the inner circumference of the second end portion of the case 2. A first end face of the fixed cover 6 is received by a second end face of the case 2. The fixed cover 6 and the case 2 are fixed to each other by a screw member 8. Specifically, the screw member 8 is inserted in a screw insertion hole formed in an outer-circumferential portion of the fixed cover 6, and is screwed into a screw hole formed in the second end portion of the case 2.

The fixed cover 6 has an oil passage 6c. The oil passage 6c is provided as a passage connecting an inner space and an outer space of the fixed cover 6, and passes through the inside of the projecting portion 6a. The oil passage 6c is connected to a supply pipe 9. Thus, a fluid lubricant such as a lubricating oil is supplied to the inner space of the cover 5 and an inner space of the case 2 via the supply pipe 9 and the oil passage 6c.

A ring-like groove is formed on a second end face of the fixed cover 6, and a seal member such as an O-ring is disposed in this groove. The seal member comes into contact with a housing of the electric motor 100 and thereby seals the fixed cover 6 against the housing in a liquid-tight manner. The fixed cover 6 and the housing of the electric motor 100 are fixed to each other using a fixing screw (not shown). A ring-like groove is formed on an outer-circumferential face of the projecting portion 6b of the fixed cover 6, and a seal member such as an O-ring is disposed in this groove. The seal member comes into contact with an inner-circumferential face of the second end portion of the case 2, and thereby seals the fixed cover 6 against the case 2 in a liquid-tight manner. The movable cover 7 is fitted to the inner circumference of the fixed cover 6.

The movable cover 7 is formed in a disk shape and disposed so as to block the opening of the fixed cover 6 on the second end side. The movable cover 7 is slidable on the inner-circumferential face of the fixed cover 6 in an axial direction S1 of the case 2 (hereinafter also referred to simply as an "axial direction S1"). The outer-circumferential face of the movable cover 7 has, for example, two ring-like grooves formed in a line in the axial direction S1, and a seal member such as an O-ring is disposed in each groove. Each seal member comes into contact with the inner-circumferential face of the fixed cover 6, and thereby seals the movable cover 7 against the fixed cover 6 in a liquid-tight manner.

An elastic member 10 such as a coil spring is attached to the movable cover 7 such that a biasing force is applied to the movable cover 7 from the elastic member 10. The movable cover 7 has an insertion hole 7a, and a motor shaft 101 is inserted in the insertion hole 7a. The motor shaft 101 is a shaft member that is provided in the electric motor 100 and projects from the housing of the electric motor 100. The motor shaft 101 extends within an accommodating space 11 formed by the case 2 and the cover 5. A motor gear 12 is connected to a tip of the motor shaft 101 so as to be able to rotate integrally. In the present embodiment, the motor shaft 101 and the motor gear 12 are integrally formed using a single material. Note that the motor shaft 101 and the motor gear 12 may alternatively be formed using different members, and the motor shaft 101 and the motor gear 12 may be integrally coupled to each other by using spline coupling.

The motor gear 12 is disposed coaxially with an axis line L1 of the reduction gear 1. In the present embodiment, the axis line L1 is the central axis line of the case 2. The axial direction S1 is a direction in which the axis line L1 extends. The motor gear 12 is a spur gear, for example. Note that the motor gear 12, the speed reduction mechanism 3 disposed within the case 2, and the pinion unit 4 (see FIG. 1) in the reduction gear 1 are disposed in tandem along the axis line L1.

The speed reduction mechanism 3 is provided as an eccentric gear mechanism including a member that rotates eccentrically with respect to the axis line L1. The speed reduction mechanism 3 includes spur gears 13, crank shafts 14, external tooth gears 15, a pin internal teeth 16, and a carrier 17.

The spur gears 13 are each provided as an input member of the speed reduction mechanism 3. The central axis line of each spur gear 13 is disposed parallel to the axis line L1. The spur gears 13 are fixed to a second end portion of the respective crank shafts 14. The spur gears 13 are disposed so as to mesh with the motor gear 12 formed on the first end side of the motor shaft 101, and are configured such that a driving force of the electric motor 100 is transmitted to the spur gears 13.

A plurality of (e.g., three) crank shafts 14 are disposed at positions at an equal angle in the circumferential direction around the axis line L1. Note that since the configurations related to all crank shafts 14 are the same, a configuration related to one of the crank shafts 14 will be mainly described below, and a detailed description of configurations related to the other crank shafts 14 will be omitted. The crank shaft 14 is disposed parallel to the axis line L1, and can rotate around a rotation center line L2 parallel to the axis line L1. The spur gear 13 is fixed to each crank shaft 14 in the vicinity of the second end portion thereof, as mentioned above. Thus, a driving force from the motor gear 12 is input to the crank shaft 14.

The crank shaft 14 is disposed so as to pass through a hole for crank 29 formed in the external tooth gear 15. The crank shaft 14 is provided as a shaft member that rotates the external tooth gear 15 eccentrically with respect to the axis line L1, as a result of the crank shaft 14 rotating due to the driving force from the motor gear 12. The crank shaft 14 rotates (revolves) around the axis line L1 in accordance with a rotation of the external tooth gear 15 due to rotation of the crank shaft 14 around the rotation center line L2 (rotation of the crank shaft 14 around its own axis).

The crank shaft 14 has a first eccentric portion 21 and a second eccentric portion 22 that are formed in tandem in an intermediate portion of the crank shaft 14 between the first end portion and the second end portion thereof. The first eccentric portion 21 and the second eccentric portion 22 are formed such that cross-sections thereof perpendicular to the axial direction S1 are circular cross-sections. The central axis lines of the first eccentric portion 21 and the second eccentric portion 22 are eccentric with respect to the rotation center line L2 of the crank shaft 14.

The crank shaft 14 is supported by the carrier 17 so as to be able to rotate relatively with respect thereto. Specifically, the crank shaft 14 has a first coaxial portion 23 and a second coaxial portion 24 that are disposed coaxially with the rotation center line L2 of the crank shaft 14. The first coaxial portion 23 and the second coaxial portion 24 are disposed so as to sandwich the first eccentric portion 21 and the second eccentric portion 22.

The first coaxial portion 23 is rotatably supported in a later-described hole for crank 36a of the carrier 17 via a plurality of first rolling bodies 25. The second coaxial portion 24 is supported in each of later-described holes for crank 35a of the carrier 17 so as to be able to rotate relatively with respect to the hole for crank 35a, via a plurality of second rolling bodies 28. The first rolling bodies 25 and the second rolling bodies 28 are needle rollers, for example.

With the above-described configuration, the crank shaft 14 has a two-point support structure in which the crank shaft 14 is supported by the carrier 17 at two points in the axial direction S1.

The external tooth gear 15 is held by the carrier 17, and output of the electric motor 100 is transmitted to the external tooth gear 15. The external tooth gear 15 includes a first external tooth gear 15*a* and a second external tooth gear 15*b* that are accommodated in the accommodating space 11 of the case 2. The central axis line of the first external tooth gear 15*a* and the central axis line of the second external tooth gear 15*a* are disposed parallel to the axis line L1. The hole for crank 29 in which the crank shaft 14 passes through is formed as a circular hole in the first external tooth gear 15*a* and the second external tooth gear 15*b*, as mentioned above. The first eccentric portion 21 of the crank shaft 14 rotatably supports the circumferential face of the hole for crank 29 in the first external tooth gear 15*a* via a plurality of third rolling bodies 26. The second eccentric portion 22 of the crank shaft 14 rotatably supports the circumferential face of the hole for crank 29 in the second external tooth gear 15*b* via a plurality of fourth rolling bodies 27. The third rolling bodies 26 and the fourth rolling bodies 27 are cylindrical rollers, for example.

The first external tooth gear 15*a* and the second external tooth gear 15*b* each has column holes 30 in which later-described columns 37 pass through, in addition to the hole for crank 29. In each of the first external tooth gear 15*a* and the second external tooth gear 15*b*, a plurality of (e.g., three) column holes 30 are disposed so as to correspond to the columns 37 at positions at an equal angle in the circumferential direction of the external tooth gear 15. The column holes 30 are formed alternately with the holes for crank 29 in the circumferential direction of the external tooth gear 15. Note that each column 37 inserted in the corresponding column hole 30 is disposed separately from the inner-circumferential face of the column hole 30 so as not to come into contact with the first external tooth gear 15*a* and the second external tooth gear 15*b*.

External teeth 31 that mesh with the pin internal teeth 16 are provided on the outer circumference of the first external tooth gear 15*a* and the second external tooth gear 15*b*. In each of the first external tooth gear 15*a* and the second external tooth gear 15*b*, the number of teeth of the external teeth 31 is provided so as to be smaller than the number of teeth of the pin internal teeth 16 by one or more. For this reason, every time the crank shaft 14 rotates, the meshing position between the external teeth 31 of the external tooth gear 15 (first external tooth gear 15*a*, second external tooth gear 15*b*) and the pin internal teeth 16 shifts. Thus, the external tooth gear 15 (first external tooth gear 15*a*, second external tooth gear 15*b*) is configured to rotate pivotably and eccentrically with respect to the axis line L1. The pin internal teeth 16 is sandwiched by a pair of retaining rings held in an inner-circumferential groove of the case 2, and is positioned in the axial direction S1. The spur gear 13, the crank shaft 14, and the external tooth gear 15 are held by the carrier 17.

As shown in FIGS. 1 and 3, the carrier 17 is accommodated within the case 2 (accommodating space 11) and extends in the axial direction S1. The central axis line of the carrier 17 coincides with the axis line L1, and the carrier 17 can rotate around the axis line L1. The carrier 17 is rotatably supported by the case 2 via a first main bearing 32 and a second main bearing 33, which serve as a pair of bearings. The carrier 17 supports the first external tooth gear 15*a* and the second external tooth gear 15*b* so as to be able to revolve around the axis line L1 and rotate eccentrically with respect to the axis line L1. The carrier 17 includes a base carrier 34 and an end carrier 35.

The base carrier 34 is an integrally molded piece formed using a single member, for example. The base carrier 34 includes a base carrier body 36, the column 37, and a recess forming portion 38. The base carrier body 36 is formed in a disk shape extending in a direction orthogonal to the axial direction S1. The base carrier body 36 has holes for crank 36*a*. The holes for crank 36*a* are round holes, and the central axis line of each hole for crank 36*a* is parallel to the axis line L1 and coaxial with the rotation center line L2. Each hole for crank 36*a* rotatably supports the corresponding first coaxial portion 23 of the crank shaft 14 via the first rolling bodies 25. Note that the holes for crank 36*a* are formed at positions at an equal angle in the circumferential direction around the axis line L1, and the first coaxial portions 23 are inserted in the respective holes for crank 36*a*.

The base carrier body 36 has a connection hole 36*b*. The connection hole 36*b* is provided in order to connect the carrier 17 and the pinion unit 4 to each other. The connection hole 36*b* passes through the base carrier body 36 in the axial direction S1, and is disposed coaxially with the axis line L1. A ring-like step portion is formed in an intermediate portion of the connection hole 36*b* in the axial direction S1. The step portion faces a second end face side of the base carrier body 34. The recess forming portion 38 extends from a first end face of the base carrier body 36.

As shown in FIG. 3, the recess forming portion 38 is provided as a portion coupled to the case 2, and is disposed in the vicinity of the first end portion of the case 2. The recess forming portion 38 is provided as a portion coupled to the pinion unit 4. The recess forming portion 38 is formed in a bottomed cylindrical shape extending from the base carrier body 36 toward the first end side of the case 2, and forms a recess portion 39. The recess forming portion 38 is disposed coaxially with the axis line L1. The length of the recess forming portion 38 in the axial direction S1 is the same as, or longer than, the length of the base carrier body 36 in the axial direction S1.

An outer-circumferential portion of the recess forming portion 38 has a cylindrical face 38*a* and an external thread portion 38*b*. The external thread portion 38*b* is disposed in a first end portion of the recess forming portion 38, and the cylindrical face 38*a* is disposed so as to be adjacent to the external thread portion 38*b*. A positioning member 40 serving as a nut member is fixed to the external thread portion 38*b*. The details of the positioning member 40 will be described later. The first main bearing 32 is attached to the cylindrical face 38*a*.

The first main bearing 32 is a rolling bearing such as a conical roller bearing, and includes an internal ring 32*a*, an external ring 32*b*, and a rolling body 32*c*. The inner-circumferential face of the internal ring 32*a* is fitted to the cylindrical face 38*a* of the recess forming portion 38. The rolling body 32*c* is a conical roller, for example, and is received by a shoulder portion 32*d* formed in a first end portion of the internal ring 32*a*. The external ring 32*b* is held by a bearing holding portion 2*b* of the case 2. The bearing holding portion 2*b* is formed on the inner-circumferential face of the first end portion of the case 2. The bearing holding portion 2*b* is a member whose cross-section has an L-shape, and has a cylindrical face extending parallel to the axis line L1 and a toric step portion extending in a direction orthogonal to the axis line L1 from a second end portion of the cylindrical face. The outer-circumferential face of the external ring 32*b* is fitted to the cylindrical face of the bearing holding portion 2b in a loose-fitting manner, and can move relatively with respect to the case 2 in the axial direction S1. A second end face of the external ring 32b is received by the step portion of the bearing holding portion 2b, and movement of the external ring 32b toward the second end side with respect to the case 2 is restricted.

The recess portion 39 forms a cylindrical space extending from the first end face of the recess forming portion 38 toward the second end side of the recess forming portion 38. A first fitting hole portion 41, an internal spline portion 43, and a second fitting hole portion 42 are formed on the inner-circumferential face of the recess portion 39. The first fitting hole portion 41, the internal spline portion 43, and the second fitting hole portion 42 are arranged in this order from the first end side toward the second end side of the recess forming portion 38.

The first fitting hole portion 41 and the second fitting hole portion 42 are provided such that a later-described first fitting portion 61 and second fitting portion 62 of the pinion unit 4 are press-fitted to the first fitting hole portion 41 and the second fitting hole portion 42, respectively. The first fitting hole portion 41 is a cylindrical face formed in a first end portion of the recess portion 39. An end of the first fitting hole portion 41 is continuous with a first end face 38c of the recess forming portion 38. The second fitting hole portion 42 is a cylindrical face formed in a second end portion (bottom portion) of the recess portion 39. The second fitting hole portion 42 is continuous with the bottom face of the recess portion 39. The second fitting hole portion 42 is adjacent to the hole for crank 36a of the base carrier body 36. The diameter of the second fitting hole portion 42 is smaller than the diameter of the first fitting hole portion 41. The internal spline portion 43 is disposed between the first fitting hole portion 41 and the second fitting hole portion 42.

The internal spline portion 43 includes a plurality of internal teeth formed at equal intervals on the inner-circumferential face of the recess portion 39. The internal spline portion 43 extends in a direction parallel to the axial direction S1, and is arranged coaxially with both the first fitting hole portion 41 and the second fitting hole portion 42. The diameter of the bottom of the internal spline portion 43, i.e., the diameter of the inner-circumferential face of the recess portion 39 in a portion where the internal spline portion 43 is formed, is smaller than the diameter of the first fitting hole portion 41 and larger than the diameter of the second fitting hole portion 42. In other words, the diameter of the inner-circumferential face of the recess portion 39 gradually decreases from the first end toward the second end of the recess portion 39.

The internal spline portion 43 is disposed separately from the first fitting hole portion 41, and is also disposed separately from the second fitting hole portion 42. The internal spline portion 43 faces the first main bearing 32 with respect to a radial direction R1 orthogonal to the axial direction S1. More specifically, a first end portion of the internal spline portion 43 faces the shoulder portion 32d of the internal ring 32a of the first main bearing 32 in the radial direction R1. A second end portion of the internal spline portion 43 faces a second end portion of the rolling body 32c of the first main bearing 32 in the radial direction R1. The columns 37 are disposed on the second end side with respect to the recess portion 39 having the above-described configuration.

As shown in FIG. 2, the columns 37 are disposed between the base carrier body 36 and the end carrier 35, and are each provided as a columnar member connecting the base carrier body 36 and the end carrier 35 to each other. There are a plurality of (e.g., three) columns 37 disposed at equal intervals around the axis line L1. Each column 37 extends parallel to the axis line L1. The column 37 and the crank shaft 14 are disposed alternately in the circumferential direction around the axis line L1. Note that since all columns 37 have the same configuration, one of the columns 37 will be mainly described below, and a detailed description of the other columns 37 will be omitted. The column 37 is formed integrally with the base carrier body 36, and is provided so as to project from a second end portion of the base carrier body 36. A second end portion of each column 37 has a column bolt hole 37a. The column bolt hole 37a faces a later-described screw through hole 35b formed in the end carrier 35. An internal thread portion is formed on the inner circumference of the column bolt hole 37a. As described above, the columns 37 are inserted in the respective column holes 30 of the first external tooth gear 15a and the second external tooth gear 15b in a freely-fitted state, and are not in contact with the first external tooth gear 15a and the second external tooth gear 15b. The columns 37 are coupled to the end carrier 35.

The end carrier 35 is provided as a disk-like member connected to the base carrier body 36 via the columns 37. The end carrier 35 is disposed in the second end portion of the case 2. As mentioned above, the end carrier 35 has the holes for crank 35a each serving as a through hole. The holes for crank 35a are provided at positions at an equal angle in the circumferential direction around the axis line L1. Each hole for crank 35a rotatably holds the second coaxial portion 24 of the crank shaft 14 via the second rolling bodies 28.

The end carrier 35 has a screw insertion hole 35b that passes through the end carrier 35 in the axial direction S1, and a column bolt 44 is inserted in this screw insertion hole 35b. The column bolt 44 is screwed into the internal thread portion of the column bolt hole 37a of the column 37. Thus, the end carrier 35 and the base carrier 34 are fixed to each other. The end carrier 35 is rotatably supported by the case 2 via the second main bearing 33.

The second main bearing 33 rotatably holds the carrier 17 with respect to the case 2, in cooperation with the first main bearing 32. That is to say, the first main bearing 32 and the second main bearing 33 constitute a pair of main bearings for holding the carrier 17. The second main bearing 33 is held by the case 2, similarly to the first main bearing 32. In the present embodiment, the second main bearing 33 is configured as a ball bearing such as an angular contact ball bearing. The second main bearing 33 has an internal ring 33a, an external ring 33b, and a rolling body 33c. The internal ring 33a is fitted to a cylindrical bearing holding portion 35c formed on the outer-circumferential face of the end carrier 35. The second end face of the internal ring 33a is received by a ring-like flange portion 35d projecting radially outward of the bearing holding portion 35c of the end carrier 35. The external ring 33b is fitted to a bearing holding portion 2c formed on the inner-circumferential face of the case 2. The bearing holding portion 2c has a cylindrical face surrounding the outer-circumferential face of the external ring 33b, and a ring-like step portion extending from a first end portion of the cylindrical face toward the inside in the radial direction R1. A first end face of the external ring 33b is received by the step portion of the bearing holding portion 2c.

As shown in FIG. 1, a preload is applied to the first main bearing 32 and the second main bearing 33. Specifically, the positioning member 40 is screwed into the external thread portion 38b of the recess forming portion 38 of the base carrier 34. When the positioning member 40 is fastened to the recess forming portion 38, the positioning member 40 is displaced toward the second end side with respect to the recess forming portion 38. Thus, a gap between the positioning member 40 and the ring-like flange portion 35*d* of the end carrier 35 is shortened. When the gap is shortened to a predetermined value, the positioning member 40 biases a first end face of the internal ring 32*a* of the first main bearing 32 toward the second end side. This biasing force is transmitted to the external ring 32*b* via the rolling body 32*c*, and the second end face of the external ring 32*b* is received by the step portion of the bearing holding portion 2*b* of the case 2. Thus, a preload is applied to the internal ring 32*a* and the external ring 32*b*. Furthermore, the flange portion 35*d* of the end carrier 35 biases the internal ring 33*a* of the second main bearing 33 toward the first end side. This biasing force is transmitted to the external ring 33*b* via the rolling body 33*c*, and the first end face of the external ring 33*b* is received by the step portion of the bearing holding portion 2*b* of the case 2. Thus, a preload is applied to the internal ring 33*a* and the external ring 33*b*.

As shown in FIG. 2, the end carrier 35 is also provided as a member for positioning the motor gear 12 in the axial direction S1. Specifically, a disk-like gear receiving member 45 is fitted to a hole portion formed at the center of the end carrier 35. The gear receiving member 45 is disposed coaxially with the axis line L1. A second end face of the gear receiving member 45 has a recess portion, and a ball 46 is fitted to the recess portion. This ball 46 is fitted to a recess portion formed in a first end face of the motor gear 12. Thus, the motor gear 12 is positioned such that the central axis line of the motor gear 12 coincides with the axis line L1.

A braking mechanism 47 capable of restricting rotation of the crank shaft 14 is formed at a position adjacent to the end carrier 35. The braking mechanism 47 includes a base member 48 and brake linings 49. The base member 48 is a member disposed on the second end side of the end carrier 35. The base member 48 has a column portion extending from a second end face of the end carrier 35 in the axial direction S1. The column portion is fixed to the end carrier 35 using a connecting pin 50.

The base member 48 has a body portion supported by the column portion, and the motor shaft 101 is inserted in an insertion hole 48*a* formed in the body portion. A plurality of brake linings 49 are disposed on the second end side of the body portion of the base member 48. The brake linings 49 are disk-like members disposed between the base member 48 and the movable cover 7, and are spline-coupled to the second end portion of the crank shaft 14. With the above-described configuration, if the movable cover 7 is displaced toward the first end side, the brake linings 49 are frictionally coupled to each other, and the brake linings 49 frictionally engage with the base member 48. Thus, rotation of the crank shaft 14 is restricted. On the other hand, if the movable cover 7 is displaced toward the second end side, both the frictional coupling among the brake linings 49 and the frictional coupling between the brake linings 49 and the base member 48 are cancelled, and the restriction on the rotation of the crank shaft 14 is cancelled.

As shown in FIG. 3, the pinion unit 4 is fixed to the carrier 17. The pinion unit 4 rotates with rotation of the carrier 17 in the speed reduction mechanism 3, and the pinion unit 4 thereby transmits torque to another gear 102 meshing with the pinion unit 4.

The pinion unit 4 is an integrally molded piece formed by cutting or forging a metallic material, or by means of other kinds of process, and the entire pinion unit 4 is integrally formed using a single material. The pinion unit 4 includes a shaft portion 51 and the pinion 52. The shaft portion 51 is coupled to the pinion 52 as a result of being formed integrally with the pinion 52 using a single material. The shaft portion 51 is coupled to the recess forming portion 38 (carrier 17) serving as an output member in the speed reduction mechanism 3, and thereby transmits the output of the speed reduction mechanism 3 to the pinion 52.

The shaft portion 51 is formed in a cylindrical shape. A portion of the shaft portion 51 accommodated in the recess portion 39 is provided as a projecting portion 60. A first fitting portion 61, an external spline portion 63, and a second fitting portion 62 are formed on the outer-circumferential face of the projecting portion 60. The first fitting portion 61, the external spline portion 63, and the second fitting portion 62 are arranged in this order from the first end side toward the second end side of the projecting portion 60 (from a base end side toward a tip end side of the projecting portion 60).

The first fitting portion 61 and the second fitting portion 62 are provided as a pair of fitting portions, and are provided so as to be press-fitted to the first fitting hole portion 41 and the second fitting hole portion 42 of the recess portion 39 of the base carrier 34, respectively. The first fitting portion 61 is a cylindrical face formed in a first end portion (base end portion) of the projecting portion 60. The second fitting portion 62 is a cylindrical face formed in a second end portion (tip end portion) of the projecting portion 60. The second fitting portion 62 is continuous with a second end face (tip end face) of the projecting portion 60. The diameter of the second fitting portion 62 is smaller than the diameter of the first fitting portion 61. The external spline portion 63 is disposed between the first fitting portion 61 and the second fitting portion 62.

The external spline portion 63 includes a plurality of external teeth formed at equal intervals on the outer-circumferential face of the projecting portion 60. The external spline portion 63 extends in a direction parallel to the axial direction S1, and is arranged coaxially with both the first fitting portion 61 and the second fitting portion 62. The diameter of the bottom of the external spline portion 63, i.e., the diameter of the outer-circumferential face of the projecting portion 60 in a portion where the external spline portion 63 is formed is smaller than the diameter of the first fitting portion 61 and larger than the diameter of the second fitting portion 62. In other words, the diameter of the outer-circumferential face of the projecting portion 60 gradually decreases from the first end toward the second end of the projecting portion 60. The external spline portion 63 is disposed separately from the first fitting portion 61, and is disposed separately from the second fitting portion 62. The external spline portion 63 meshes with the internal spline portion 43.

The first fitting portion 61 is press-fitted and fixed to the first fitting hole portion 41 in a tight-fitting manner. The first fitting portion 61 and the first fitting hole portion 41 form a first press-fit coupled portion 65. The second fitting portion 62 is press-fitted and fixed to the second fitting hole portion 42 in a tight-fitting manner. The second fitting portion 62 and the second fitting hole portion 42 form a second press-fit coupled portion 66. Interference between the first fitting hole portion 41 and the first fitting portion 61 of the first press-fit coupled portion 65 may be the same as, or may be different from, interference between the second fitting hole portion 42 and the second fitting portion 62 of the second press-fit coupled portion 66.

The first press-fit coupled portion 65 and the second press-fit coupled portion 66 have a configuration for promoting a flow of the lubricating oil within the accommodating space 11. Specifically, in the first press-fit coupled portion 65, a helical groove is formed on the outer-circumferential face of the first fitting portion 61. This groove has a depth of about several dozen micrometers, for example, and extends from a first end toward a second end of the first fitting portion 61. As a result of the groove being formed on the outer-circumferential face of the first fitting portion 61, this groove can be easily viewed in the pinion unit 4 when in a separated state. Note that a helical groove similar to the aforementioned groove may also be formed on the inner-circumferential face of the first fitting hole portion 41.

In the second press-fit coupled portion 66, a helical groove is formed on the outer-circumferential face of the second fitting portion 62. This groove has a depth of about several dozen micrometers, for example, and extends from a first end toward a second end of the second fitting portion 62. As a result of the groove being formed on the outer-circumferential face of the second fitting portion 62, this groove can be easily viewed in the pinion unit 4 when in a separated state. Note that a helical groove similar to the aforementioned groove may also be formed on the inner-circumferential face of the second fitting hole portion 42.

As mentioned above, the external spline portion 63 meshes with the internal spline portion 43. The lubricating oil that has passed through the second press-fit coupled portion 66 is supplied to a space between the external spline portion 63 and the internal spline portion 43. A spline-coupled portion 67 is formed by the external spline portion 63 and the internal spline portion 43.

Note that at least one of the external spline portion 63 and the internal spline portion 43 in the spline-coupled portion 67 may have undergone a curing process. A possible exemplary curing process is a process in which tempering is performed after quenching. The radial thickness of the projecting portion 60 and the recess portion 39 that undergo the curing process is set to as large a value at which substantial deformation does not occur resulting from heat treatment.

Among the first press-fit coupled portion 65, the second press-fit coupled portion 66, and the spline-coupled portion 67, the spline-coupled portion 67 is longest in the axial direction S1 in the present embodiment. Thus, allowable transmitted torque of the spline-coupled portion 67 is increased as much as possible. Furthermore, of the first press-fit coupled portion 65 and the second press-fit coupled portion 66, the second press-fit coupled portion 66 is longer in the axial direction S1. Thus, the coupling strength between the recess forming portion 38 and the shaft portion 51 at the tip of the shaft portion 51 can be increased. As a result, when torque is transmitted from the pinion 52 to the gear 102, the amount of twisting of the tip of the shaft portion 51 with respect to the recess forming portion 38 can be reduced. Accordingly, the uniformity of contacting state between the external spline portion 63 and the internal spline portion 43 can be increased over the entire area in the axial direction S1. Thus, a biased load on the spline-coupled portion 67 can be reduced, and the durability of the spline-coupled portion 67 can be improved.

The spline-coupled portion 67 is disposed between the first press-fit coupled portion 65 and the second press-fit coupled portion 66 with respect to the axial direction S1. Thus, if the torque transmitted to the carrier 17 and the shaft portion 51 is relatively low, this torque is transmitted through the first press-fit coupled portion 65 and the second press-fit coupled portion 66, and is not transmitted to the spline-coupled portion 67. Thus, the spline-coupled portion 67 will mainly receive the high torque transmitted from the electric motor 100 to the speed reduction mechanism 3 (carrier 17), out of the load.

The second press-fit coupled portion 66 is disposed on the second end side with respect to the first main bearing 32. A first end portion of the second press-fit coupled portion 66 faces a second end portion of the first main bearing 32 in the radial direction R1. The spline-coupled portion 67 faces the first main bearing 32 in the radial direction R1. More specifically, a first end portion of the spline-coupled portion 67 faces the shoulder portion 32d of the internal ring 32a of the first main bearing 32 in the radial direction R1. A second end portion of the spline-coupled portion 67 faces the rolling body 32c of the first main bearing 32 in the radial direction R1. The first press-fit coupled portion 65 faces the positioning member 40 in the radial direction R1, and faces a later-described oil seal 71 in the radial direction R1.

With the above-described configuration, the projecting portion 60 of the shaft portion 51 is press-fitted and spline-coupled to the recess portion 39 of the carrier 17. The projecting portion 60 and the recess portion 39 face the first main bearing 32 in the radial direction R1, and are surrounded by the first main bearing 32. Thus, the projecting portion 60 is rotatably supported by the first main bearing 32 and the second main bearing 33 via the carrier 17 (see FIG. 1), and in particular is rotatably supported by the first main bearing 32.

The shaft portion 51 is fixed to the carrier 17, using a fixing screw (screw member) 68. Specifically, the base carrier body 36 has the connection hole 36b, as mentioned above. The connection hole 36b is formed coaxially with the axis line L1, and a step portion is formed as a result of the connection hole 36b being shaped such that the inner diameter is increased in the course of extending from the first end side toward the second end side. A collar 53 is inserted in the connection hole 36b.

The collar 53 is formed in a cylindrical shape and has a collar portion on the outer circumference of a second end portion thereof. The collar 53 is accommodated in the connection hole 36b and is received by the step portion of the connection hole 36b. A first screw hole 51a is formed in a second end portion of the shaft portion 51 so as to be adjacent to the collar 53. The first screw hole 51a is formed coaxially with the axis line L1, and an internal thread portion is formed on the inner circumference of the first screw hole 51a. The fixing screw 68 is inserted in the connection hole 36b from the second end side of the base carrier body 36 in a state where a washer is fitted therebetween, and inserted in the insertion hole of the collar 53. The fixing screw 68 is further inserted in the first screw hole 51a of the shaft portion 51, and an external thread portion of the fixing screw 68 is screwed into the internal thread portion of the first screw hole 51a. Thus, the fixing screw 68 is held by the carrier 17 via the collar 53.

Furthermore, the shaft portion 51 and the pinion 52 are held by the base carrier 34 of the carrier 17 due to an axial force received by the shaft portion 51 from the fixing screw 68. At this time, a second end face of the pinion 52 faces the first end face 38c, which serves as a predetermined opposing face of the carrier 17, in the axial direction S1, and is received by the first end face 38c via the positioning member 40.

A first end portion of the shaft portion 51 is provided with a connecting portion 69. The connecting portion 69 is provided as a portion connecting the projecting portion 60 and a second end portion of the pinion 52 to each other. The connecting portion 69 projects outward of the recess portion 39. The outer-circumferential face of the connecting portion 69 is a smooth curved surface having a diameter that continuously increases towards the pinion 52, and is connected to the second end face of the pinion 52. Thus, the connecting portion 69 between the pinion 52 and the shaft portion 51 has a smooth shape, and it is difficult for stress to concentrate on the connecting portion 69. The pinion 52 is provided as an output member of the reduction gear 1. That is to say, the carrier 17 is provided as an output member of the speed reduction mechanism 3, and the pinion 52 is provided as an output member for outputting the output from the speed reduction mechanism 3 to the outside of the reduction gear 1.

The pinion 52 is disposed at a first end portion of the reduction gear 1. The pinion 52 is disposed coaxially with the axis line L1, and projects from the case 2. The root circle diameter of the pinion 52 is larger than the inner diameter of the first end portion of the recess portion 39 of the carrier 17 (diameter of the first fitting portion 61). The inside of the pinion unit 4, i.e., the inside of the pinion 52 and the inside of the shaft portion 51 are formed such that the portion other than the first screw hole 51a and the second screw hole 51b is a solid portion without a cavity. Thus, the strength of the pinion 52 and the shaft portion 51 can be sufficiently ensured, and consequently, the strength of the pinion unit 4 can be sufficiently increased. The outer diameter of the pinion 52, i.e., the tip diameter of the pinion 52 is larger than the outer diameter of the recess forming portion 38 of the carrier 17.

In the present embodiment, the diameter of a pitch circle 52a of the pinion 52 has the same value as that of the outer diameter of the recess forming portion 38 of the carrier 17. A second end face of each teeth portion 52b formed on the outer circumference of the pinion 52 is a flat face orthogonal to the axial direction S1.

The positioning member 40 is disposed at a position adjacent to the teeth portion 52b. As mentioned above, the positioning member 40 is a nut member, and is screwed into the recess forming portion 38 of the carrier 17. This positioning member 40 is provided in order to apply a preload to the first main bearing 32 and the second main bearing 33 (see FIG. 1). The positioning member 40 has a cylindrical body portion and a flange portion 40a projecting radially inward of the body portion from an end thereof.

An internal thread portion 40b is formed on the inner circumference of a main body portion of the positioning member 40. The internal thread portion 40b is screwed into the external thread portion 38b at an end of the recess forming portion 38. A second end face of the positioning member 40 is provided as a toric flat face and is in surface contact with the first end face of the internal ring 32a of the first main bearing 32. The outer-circumferential face of the positioning member 40 is formed in a cylindrical shape. A first end face of the positioning member 40 is formed by the cylindrical body portion and the flange portion 40a. The first end face of the positioning member 40 is arranged parallel to the second end face of the positioning member 40, and is arranged parallel to the second end face of the pinion 52. The first end face of the positioning member 40 is in surface contact with the second end face of the pinion 52. The second end face of the flange portion 40a is in contact with the first end face 38c of the recess forming portion 38.

The flange portion 40a is formed in a ring shape. An inner-circumferential portion of the flange portion 40a on the first end side has a ring-shaped cutout, and contact between the flange portion 40a and the connecting portion 69 of the shaft portion 51 is avoided. A seal member 70 such as an O-ring is disposed in the aforementioned cutout of the flange portion 40a. Thus, liquid-tight sealing is achieved between the positioning member 40 and the pinion 52.

The second screw hole 51b is formed in a first end face of the pinion 52. An external screw (not shown) of an operational screw member is screwed into an internal screw of the second screw hole 51b, and the projecting portion 60 of the pinion unit 4 can thereby be fitted to the recess portion 39 of the carrier 17 using the operational screw member.

The oil seal 71 is disposed on the outer circumference of the positioning member 40. The oil seal 71 includes one or more (in the present embodiment, two) seal members 72. Each seal member 72 is formed in a ring shape, using an elastic member such as oil-resistant lubber. A projecting and ring-shaped lip is formed on the inner circumference of each seal member 72. The lip is in slidable contact with the outer-circumferential face of the positioning member 40. An outer-circumferential portion of each seal member 72 is held on the inner circumference of an end of the case 2. Thus, liquid-tight sealing is achieved between the end of the case 2 and the positioning member 40.

As shown in FIG. 1, the lubricating oil supplied from the supply pipe 9 to the inside of the accommodating space 11 lubricates the first to fourth rolling bodies 25 to 28, the second main bearing 33, the pin internal teeth 16, the first main bearing 32, the second press-fit coupled portion 66, the spline-coupled portion 67, the first press-fit coupled portion 65, and the like.

Next, the operation of the reduction gear 1 will be described. The reduction gear 1 is driven as a result of the electric motor 100 being run. Upon running of the electric motor 100 being started, the motor shaft 101 of the electric motor 100 rotates, and the spur gear 13 meshing with the motor gear 12 of the motor shaft 101 rotates. Upon the spur gear 13 rotating, the crank shaft 14 to which the spur gear 13 is fixed rotates around the rotation center line L2. Thus, a load is exerted on the first and second external tooth gears 15a and 15b from the first and second eccentric portions 21 and 22, respectively. As a result, the first and second external tooth gears 15a and 15b eccentrically rotates with respect to the axis line L1 so as to pivot while shifting the meshing positions between the first and second external tooth gears 15a and 15b and the pin internal teeth 16. With the eccentric rotation of the first and second external tooth gears 15a and 15b, the crank shaft 14 rotatably held by the first and second external tooth gears 15a and 15b rotates around the rotation center line L2 (rotates around its own axis) while rotating (revolving) around the axis line L1. As a result of the revolving operation of the crank shaft 14, the carrier 17 rotates around the axis line L1. Consequently, large torque from the electric motor 100 that has been amplified once due to the meshing between the motor gear 12 and the spur gear 13 and thereafter further amplified again by the speed reduction mechanism 3 is transmitted from the carrier 17 to the pinion unit 4. This large torque is output from the pinion 52 of the pinion unit 4 to the gear 102.

With the above-described reduction gear 1, since the shaft portion 51 and the pinion 52 are integrally formed, the coupling strength between the shaft portion 51 and the pinion 52 can be greatly increased. Thus, the shaft portion 51 driven when receiving the output from the speed reduction mechanism 3 can transmit a large output (torque) to the pinion 52. Accordingly, the allowable output of the reduction gear 1 can be further increased. As a result of the pair of main bearings 32 and 33 supporting the carrier, the carrier 17 and the pair of main bearings 32 and 33 can be disposed so as to face each other in the radial direction R1 (such that the positions thereof in the axial direction S1 overlap each other). Thus, the length that the carrier 17 and the pair of main bearings 32 and 33 occupy in the axial direction S1 as a whole can be shortened, and consequently, a reduction in size of the reduction gear 1 can be achieved.

Accordingly, with the reduction gear 1, the allowable output can be further increased, and a reduction in size can be achieved.

Furthermore, with the reduction gear 1, the shaft portion 51 and the carrier 17 can be connected with a simple configuration in which the internal spline portion 43 of the recess portion 39 is fitted to the external spline portion 63 of the projecting portion 60. Moreover, due to the configuration in which the projecting portion 60 is extended in the axial direction S1 from an end portion of the pinion 52, the pinion 52 can be configured as a solid member. Thus, both the strength of the pinion 52 and the coupling strength between the pinion 52 and the shaft portion 51 can be increased, and consequently, the allowable output of the reduction gear 1 can be further increased.

Furthermore, with the reduction gear 1, the shaft portion 51 is rotatably supported by the first main bearing 32 and the second main bearing 33 via the carrier 17. Thus, the first main bearing 32 and the second main bearing 33 that support the carrier 17 can also be used as bearings for supporting the shaft portion 51. For this reason, another bearing for supporting the shaft portion 51 does not need to be separately attached to the shaft portion, and therefore the shaft portion 51 will not be elongated in the axial direction S1. Accordingly, a further reduction in size of the reduction gear 1 can be achieved.

Furthermore, with the reduction gear 1, the spline-coupled portion 67 faces the first main bearing 32 in the radial direction R1 (the radial direction of the shaft portion 51). For this reason, the length that the shaft portion 51, the carrier 17, and the first main bearing 32 occupy in the axial direction S1 as a whole can be shortened. Accordingly, a further reduction in size of the reduction gear 1 can be achieved.

Furthermore, with the reduction gear 1, the pair of fitting portions 61 and 62 of the shaft portion 51 are provided so as to sandwich the spline-coupled portion 67 in the axial direction S1, and are fixed to the corresponding fitting hole portions 41 and 42 of the carrier 17 in a tight-fitting manner. For this reason, at least a part of a load exerted between the shaft portion 51 and the carrier 17 can be received by the pair of fitting portions 61 and 62. Thus, the load exerted on the spline-coupled portion 67 can be reduced. That is to say, the durability of the spline-coupled portion 67 can be improved through the reduction in the load on the spline-coupled portion 67. Furthermore, since the pair of fitting portions 61 and 62 are disposed so as to sandwich the spline-coupled portion 67 in the axial direction S1, exertion of a force other than torque on the spline-coupled portion 67 is suppressed. That is to say, exertion of a force other than the force intended in design on the spline-coupled portion 67 is suppressed. Thus, the durability of the reduction gear 1 can be improved through the reduction in the load on the spline-coupled portion 67.

Furthermore, with the reduction gear 1, the pinion unit 4 and the fixing screw 68 are fixed to the carrier 17 so as to sandwich the carrier 17. Thus, relative movement of the shaft portion 51 and the carrier 17 in the axial direction S1 can be suppressed, and consequently, fretting friction in the spline-coupled portion 67 can be suppressed.

Modifications

Although an embodiment of the present invention has been described above, the present invention is not limited to the above-described embodiment, and various modifications may be implemented within the scope recited in the claims. For example, the following modifications may be implemented.

(1) Although the above embodiment has described an exemplary mode in which lubricating oil is supplied to the spline-coupled portion, this need not be the case. For example, the spline-coupled portion may be filled with grease serving as a semisolid lubricant. In this case, a pair of seal members are disposed between the recess portion of the carrier and the projecting portion of the shaft portion so as to sandwich the spline-coupled portion in the axial direction. Thus, outflow of the grease from the spline-coupled portion can be suppressed for a long period of time.

(2) The above embodiment has described an exemplary mode in which the recess portion is provided in the carrier, the projecting portion is provided in the shaft portion, and the recess portion and the projecting portion are fitted to each other. However, this need not be the case. For example, a projecting portion may be provided in the first end portion of the carrier, a recess portion may be provided at a second end of the shaft portion of the pinion unit, and the projecting portion and the recess portion may be fitted to each other. In this case as well, the recess portion has the first fitting hole portion, the internal spline portion, and the second fitting hole portion. Also, the projecting portion has the first fitting portion, the external spline portion, and the second fitting portion.

Figure 4:
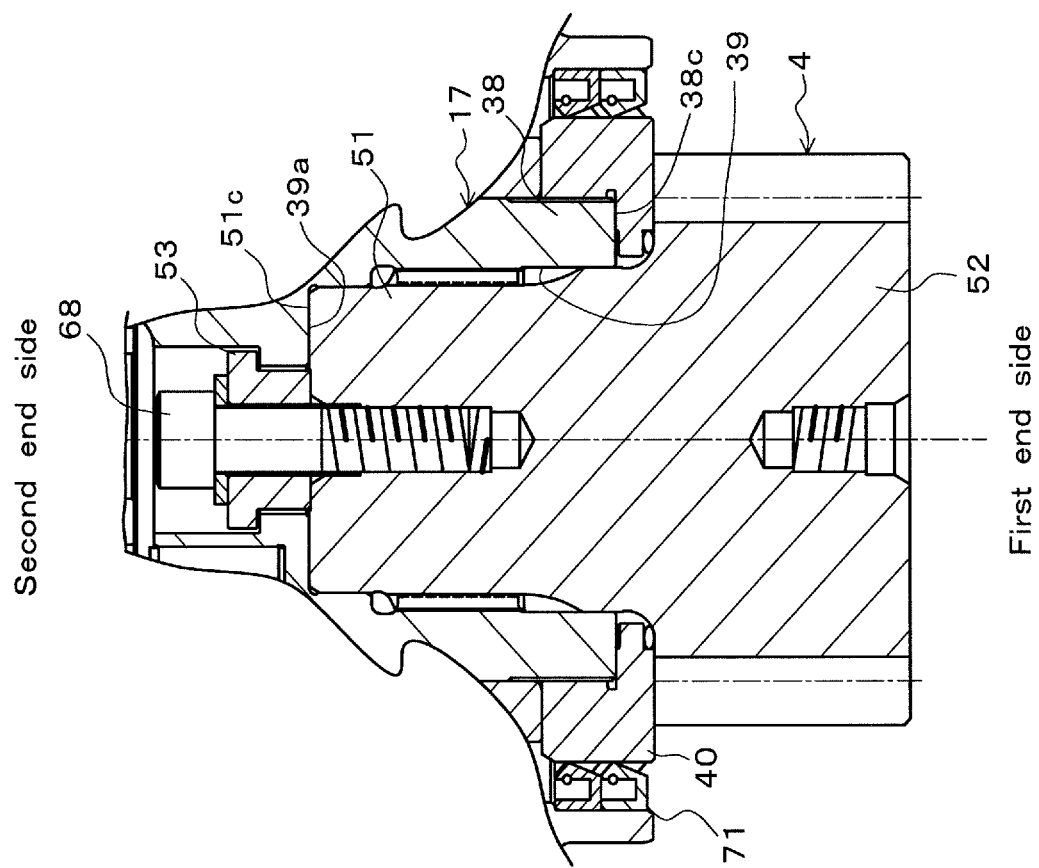
FIG. 4 is a diagram showing a main part of a modification of a reduction gear.

(3) Although the above embodiment has described an exemplary mode in which the second end face of the pinion in the pinion unit is pressed against the first end face of the recess forming portion of the carrier via the positioning member, this need not be the case. For example, as shown in FIG. 4, a bottom face 39a serving as a predetermined opposing face of the recess portion 39 may be caused to receive a second end face 51c of the shaft portion 51 of the pinion unit 4 due to an axial force of the fixing screw 68, and the pinion unit 4 may thereby be held by the recess forming portion 38 of the carrier 17. At this time, the second end face of the pinion 52 may be, but does not have to be, received by the recess forming portion 38 of the carrier 17.

(4) Although the above embodiment has described an exemplary mode in which an eccentric gear mechanism is provided as the speed reduction mechanism, this need not be the case. For example, a planetary gear mechanism may be used as the speed reduction mechanism. In the case of using a planetary gear mechanism, planetary gears are the gears to which output of the electric motor serving as a driving source is transmitted. These planetary gears are supported by the carrier so as to be able to rotate around the central axis line of the planetary gears and revolve around the central axis line of the carrier. Alternatively, the speed reduction mechanism may be a speed reduction mechanism having both an eccentric gear mechanism and a planetary gear mechanism.

(5) Although the above embodiment has described an exemplary mode in which an electric motor is used as the motor, this need not be the case. Other motors, such as a hydraulic motor, may be used as the motor.

(6) The number of crank shafts and columns may be different from the number thereof described in the present embodiment. The type of each bearing may be modified as appropriate for implementation.

(7) The shapes of the members in the reduction gear, namely the case, the speed reduction mechanism, the pinion unit, and the like may be different from the exemplary shapes thereof in the present embodiment.

INDUSTRIAL APPLICABILITY

The present invention can be widely applied to reduction gears connected to motors.

DESCRIPTIONS OF REFERENCE NUMERALS

1 Reduction gear
2 Case
3 Speed reduction mechanism
15 External tooth gear (gear to which output of a motor is transmitted)
17 Carrier
32 First main bearing (one of a pair of bearings)
33 Second main bearing (the other of the pair of bearings)
51 Shaft portion
52 Pinion
100 Electric motor (motor)

The invention claimed is:

1. A reduction gear comprising:
a case;
a speed reduction mechanism accommodated within the case and having a gear to which output of a motor is transmitted and a carrier that holds the gear;
a shaft portion to which output of the speed reduction mechanism is transmitted; and
a pinion coupled to the shaft portion,
wherein the pinion and the shaft portion are integrally formed, and the shaft portion and the carrier are spline-coupled to each other,
the reduction gear further comprises a pair of bearings that are held by the case and rotatably support the carrier, and
a portion where a spline portion of the shaft portion and a spline portion of the carrier meshes with each other so as to form a spline-coupled portion faces one of the pair of the bearings, in a radial direction of the shaft portion.

2. The reduction gear according to claim 1,
wherein the shaft portion includes a projecting portion having, on an outer circumference thereof, an external spline portion, and
the carrier includes a recess portion having, on an inner circumference thereof, an internal spline portion meshing with the external spline portion.

3. The reduction gear according to claim 1, wherein the shaft portion is rotatably supported by the pair of bearings via the carrier.

4. The reduction gear according to claim 1, wherein
the portion where the spline portion of the shaft portion and the spline portion of the carrier meshes with each other so as to form the spline-coupled portion faces a center portion, in its axial length, of one of the pair of the bearings, in a radial direction of the shaft portion.

5. The reduction gear according to claim 1, wherein the shaft portion has a pair of fitting portions fitted to the carrier and provided so as to sandwich, in an axial direction, the portion where the shaft portion and the carrier are spline-coupled to each other, and
the pair of fitting portions are fixed to the carrier in a tight-fitting manner.

6. The reduction gear according to claim 1, further comprising a screw member that is screwed into the shaft portion and held by the carrier,
wherein at least one of an end face of the pinion and an end face of the shaft portion is received so as to face a predetermined opposing face of the carrier in the axial direction, and
the pinion and the shaft portion are held by the carrier due to an axial force received by the shaft portion from the screw member.

* * * * *